Nov. 17, 1925.                                          1,561,608
                        W. E. JOHN
            RESILIENT RING AND METHOD OF MAKING SAME
                   Filed Nov. 26, 1923        2 Sheets-Sheet 1
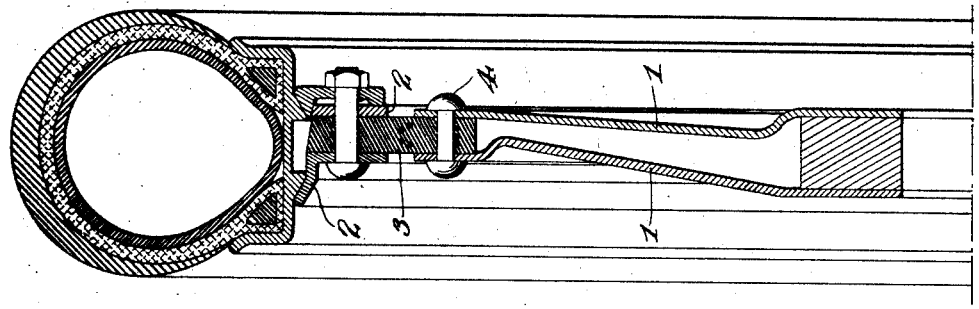
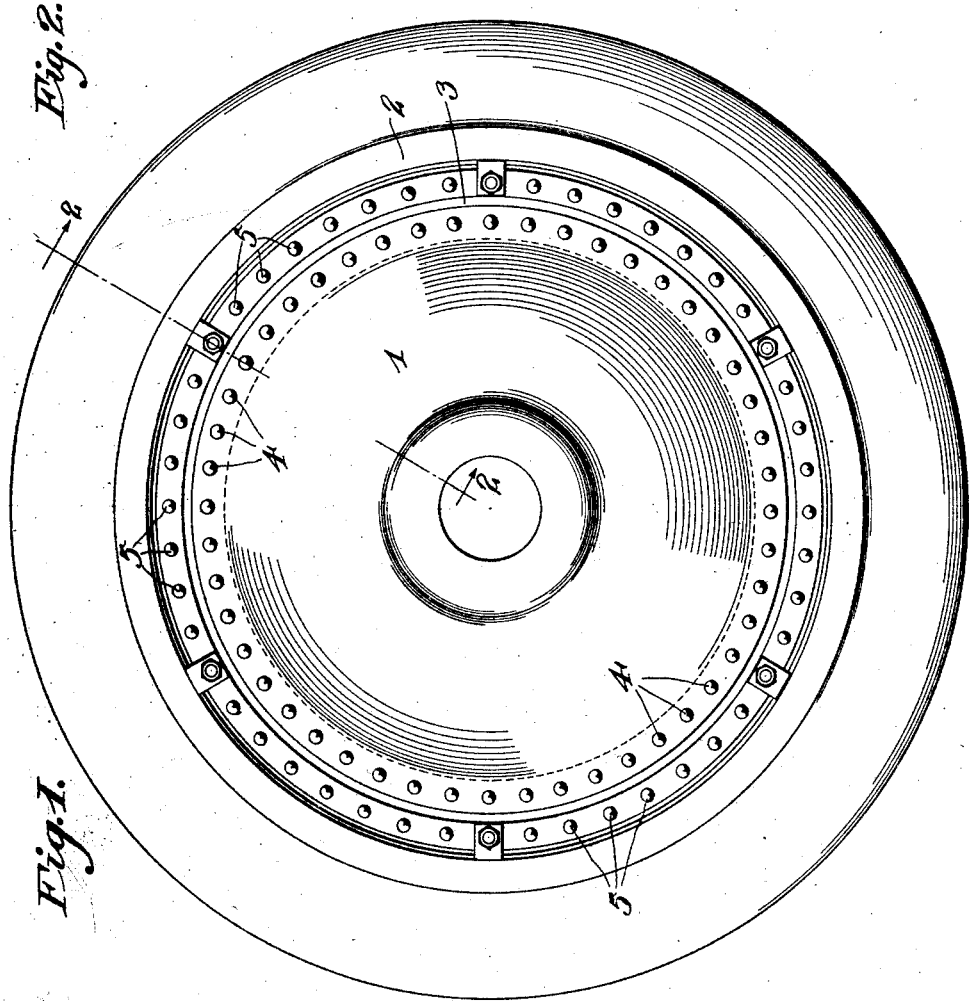
WITNESSES:                                       INVENTOR
                                            William Edgar John
                                                    BY
                                              Joshua R. H. Potts
                                              HIS ATTORNEY Nov. 17, 1925. 1,561,608
W. E. JOHN
RESILIENT RING AND METHOD OF MAKING SAME
Filed Nov. 26, 1923 2 Sheets-Sheet 2
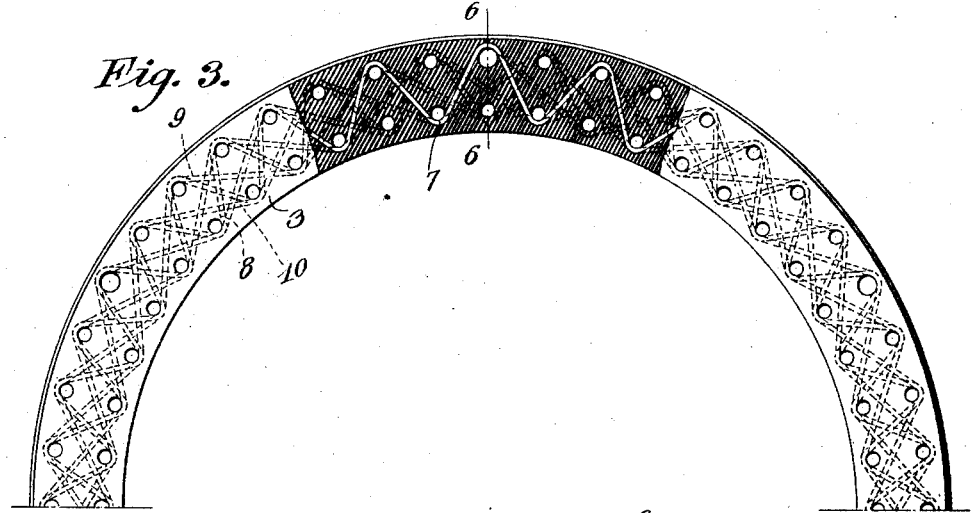
Fig. 3.
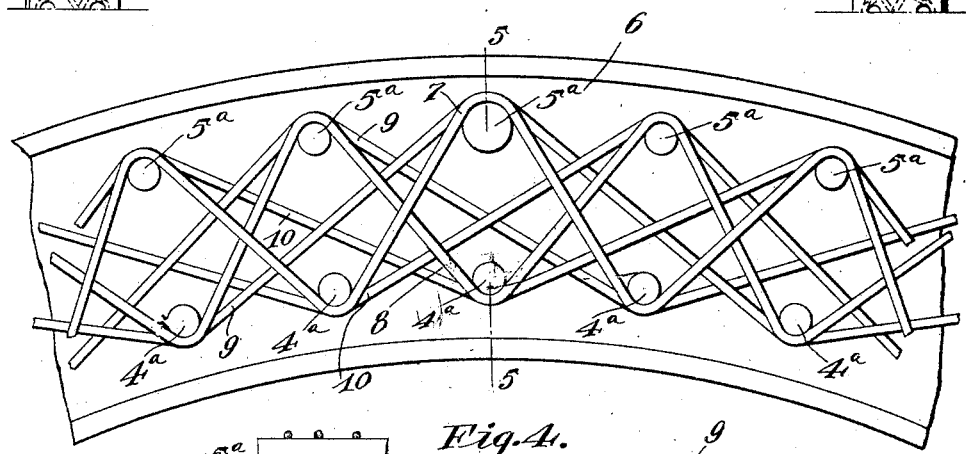
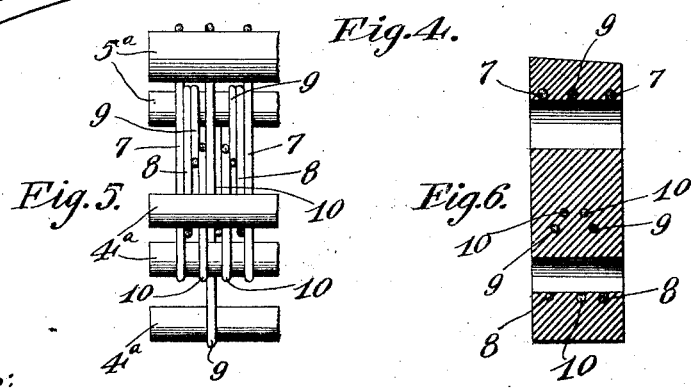
Fig. 4.
Fig. 5. Fig. 6.
Witnesses: Inventor
William Edgar John
By Joshua R. H. Potts
His Attorney Patented Nov. 17, 1925.

1,561,608

UNITED STATES PATENT OFFICE.

WILLIAM EDGAR JOHN, OF PHILADELPHIA, PENNSYLVANIA, ASSIGNOR TO HALL WHEEL CORPORATION, OF PHILADELPHIA, PENNSYLVANIA.

RESILIENT RING AND METHOD OF MAKING SAME.

Application filed November 26, 1923. Serial No. 676,836.

*To all whom it may concern:*

Be it known that I, WILLIAM EDGAR JOHN, a citizen of the United States, residing at Philadelphia, in the county of Philadelphia and State of Pennsylvania, have invented certain new and useful Improvements in Resilient Rings and Methods of Making Same, of which the following is a specification.

My invention relates to resilient rings. One use for which rings embodying my invention are especially adapted is for making a yielding connection between the disks and the rims of disk wheels and I have illustrated the ring as applied to such use.

One object of my invention is to provide a resilient ring which includes a net work of threads or cords so disposed and supported that stresses, upon the ring such as those induced by shocks imparted to the vehicle wheels or due to starting and stopping the vehicle, will be uniformly distributed upon the threads or cords throughout their length. Another object is to provide a simple and economical method of manufacturing such rings.

In the drawings,

Figure 1 is a side view of a disk wheel having my invention applied thereto,

Figure 2 an enlarged fragmentary section on the line 2—2 of Figure 1,

Figure 3 a fragmentary side view, partly in section, of a resilient ring constructed in accordance with my invention, Figure 4 a face view of a former which may be used in constructing the ring, the former being shown on an enlarged scale relatively to the ring, Figure 5 a section on the line 5—5 of Figure 4, and Figure 6 a section on line 6—6 of Figure 3.

Referring to the drawings, 1 indicates the disks, 2 the rim and 3 my improved resilient ring which is shown as secured to the disks by rivets 4 and to the rim by rivets 5. The resilient ring is preferably constructed upon a former having a suitable base 6 and provided with a series of pins $4^a$ corresponding in position to rivets 4 and another series of pins $5^a$ corresponding in position to rivets 5. The former is preferably adapted to serve as the lower flask of a mold. Assuming that the pins $4^a$ and $5^a$ project horizontally, and that a cord 7 starts from a pin $5^a$, the cord is reeled on the pins, zig-zag fashion, in the following manner. It is first passed under a diagonally adjacent pin $4^a$, then over the next diagonally adjacent pin $5^a$, under the next diagonally adjacent pin $4^a$ and so on until the circuit is completed. In other words it is passed under alternate pins in the inner series of pins and over alternate pins in the outer series. Another cord 8 is then attached to the pins $4^a$ which is opposite the pin $5^a$, which was the starting point for the first winding, and is passed over a diagonally adjacent pin $5^a$, under the next diagonally adjacent pin $4^a$ and so on until the circuit is completed. It will be noted that this cord passes over and under the alternate pins in each series which were skipped in the first winding. A third cord, 9, is then attached to one of the pins $5^a$, but, instead of passing under the diagonally adjacent pin in the other series, it is passed under the next pin in that series and over the second adjacent pin in the other series and so on until the circuit is completed. A fourth cord, 10, is then attached to the pin $4^a$, opposite the pin $5^a$ from which the third cord started, and is reeled in the same manner until the circuit is completed. These windings are repeated until the mass is sufficient to form the ring. A filler of any suitable composition is then poured into the mold and molded about the cords, sufficient pressure being applied to form a compact ring of the desired thickness. When the ring is removed from the mold the holes left by the pins serve as rivet holes for securing the ring to the disks and rim of a wheel.

If the total number of rivets and of the corresponding pins in the mold be an odd number the windings may be made from a single cord inasmuch as, when the first circuit is completed, the cord will pass to a pin which was skipped in the first circuit and the windings may be completed by a single cord.

It is obvious that the windings may be varied and the series of windings above described is to be taken as indicating a preferred form.

Except when otherwise indicated I use the term cord as indicating any kind of a strand, fibrous or metallic, which has the needed strength and resiliency.

A ring constructed as above described will absorb the shocks imparted by the vehicle wheel and the torsional stresses due to starting and stopping the vehicle will be uniformly distributed upon the cord or cords.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The herein described method of constructing resilient rings consisting in reeling a cord or cords about an outer and an inner series of pins, the cords passing successively from a pin in one series to a pin in the other series; adding a filler, and molding the filler about the cords and pins.

2. The herein described method of constructing resilient rings consisting in reeling a cord or cords about an outer and an inner series of pins, the cords passing successively from a pin in one series to the next diagonally adjacent pin in the other series then, in the same way, from a pin skipped in the first circuit to the other pins skipped in that circuit, then from a pin in one series to a non-adjacent pin in the other series; adding a filler and molding the filler about the cords and pins.

3. A resilient ring consisting of a cord or cords and a filler molded thereabout, the ring including an outer and an inner series of rivet holes and the cord or cords being so reeled that they pass successively over a rivet hole in one series and under a rivet hole in the other series.

4. A resilient ring consisting of a fibrous cord or cords and a filler molded thereabout, the ring including an outer and an inner series of rivet holes and the cord or cords being so reeled that they pass successively over a rivet hole in one series and under a rivet hole in the other series.

In testimony whereof I have signed my name to this specification.

WILLIAM EDGAR JOHN.